A. H. HALE.
BRAKE.
APPLICATION FILED NOV. 13, 1912.
1,153,382.
Patented Sept. 14, 1915.
2 SHEETS—SHEET 2.
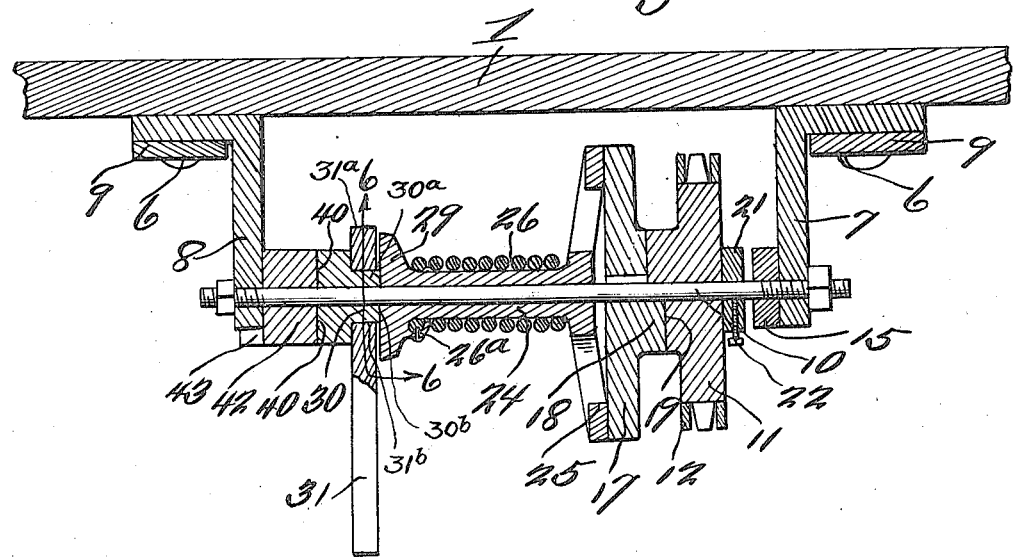
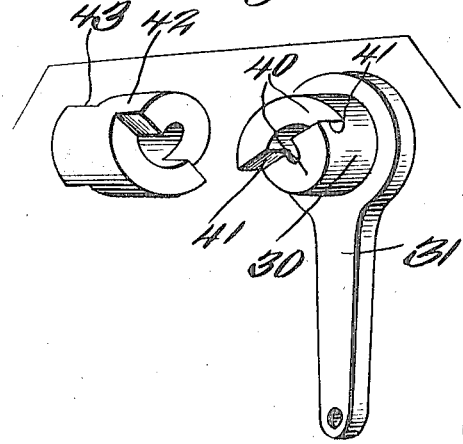
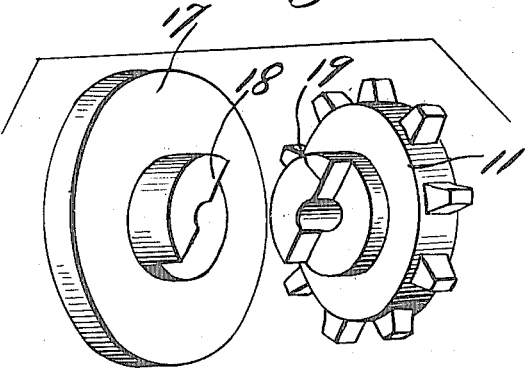
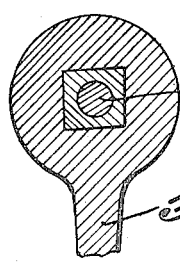
Witnesses
Inventor
Albert H. Hale,
By
his Attorneys

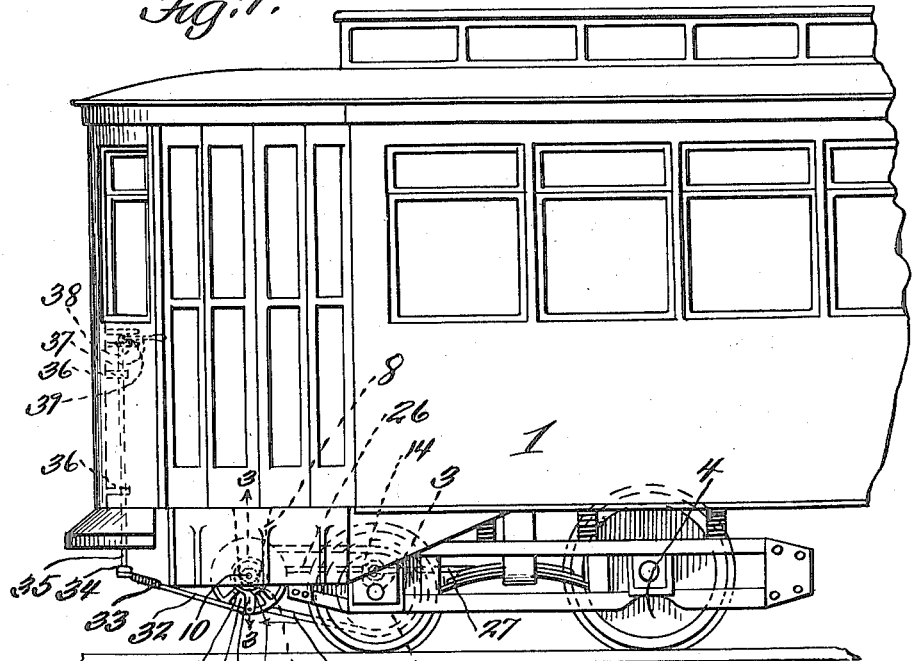
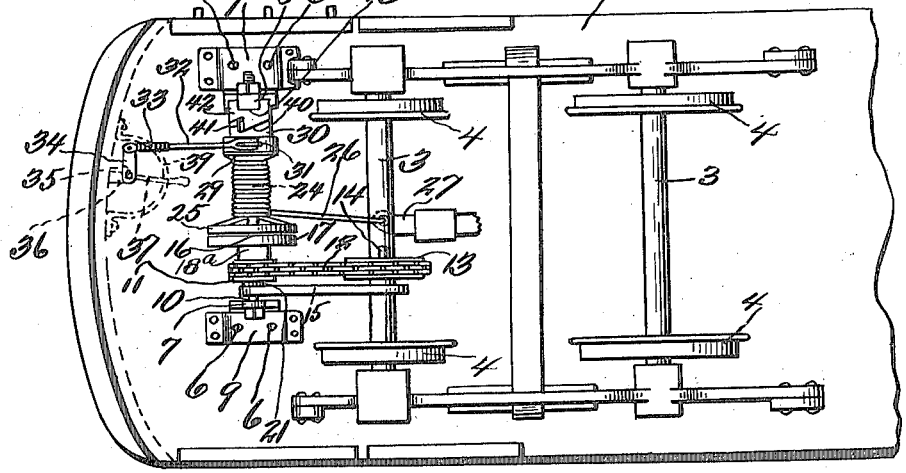

UNITED STATES PATENT OFFICE.

ALBERT H. HALE, OF CAIRO, ILLINOIS.

BRAKE.

1,153,382.

Specification of Letters Patent. Patented Sept. 14, 1915.

Application filed November 13, 1912. Serial No. 731,197.

*To all whom it may concern:*

Be it known that I, ALBERT H. HALE, a citizen of the United States, residing at Cairo, in the county of Alexander and State of Illinois, have invented a new and useful Brake; and I do hereby declare the following to be a full, clear, and exact description of the invention, such as will enable others skilled in the art to which it appertains to make and use the same.

This invention relates to a new and useful brake appliance.

As one of the objects of the invention, it is the aim to provide an improved appliance of this nature particularly applicable to any construction of street railway cars now in use, for more efficiently applying the brakes.

Another object of the invention is the provision of improved friction mechanism operable by means of a lever controlled clutch mechanism, and having connections with the brake rod for throwing the brake shoes.

In the drawings there are disclosed certain features of construction, but in practical fields these features may necessitate alterations, to which the patentee is entitled, provided the alterations are comprehended within the scope of what is claimed.

The invention comprises further features and combination of parts, as hereinafter set forth, shown in the drawings and claimed.

In the drawings:—Figure 1 is a view showing the application of the improved appliance as applied to a portion of a street railway car. Fig. 2 is a bottom plan view showing the sprocket 11 and the friction disk 17 constructed in one piece. Fig. 3 is a sectional view on line 3—3 of Fig. 1. Fig. 4 is a detail view showing the two clutch members 30 and 42. Fig. 5 is a detail view showing the friction disk 17 and the sprocket wheel 11. Fig. 6 is a detail view on line 6—6 of Fig. 3.

Referring more particularly to the drawings 1 designates a portion of a car body having the usual drive axles 3 and wheels 4. Secured at 6 to the bottom of the car body is a pair of bearing brackets 7 and 8, each being reinforced by the straps 9. Journaled in the bearing brackets is a shaft 10, on which a sprocket wheel 11 is mounted. Passing about the sprocket 11 is a sprocket chain 12, which in turn travels about the sprocket 13 on one of the car drive axles 3. The sprocket wheel 13 is keyed at 14 to the car drive axle 3. A bar or rod 15 connects the shaft 10 and one of the car axles 3, so as to brace the shaft 10.

Mounted upon the shaft 10 is a friction disk 17, and forming a part or otherwise constructed to the friction disk 17 is a clutch member 18, which coöperates with the clutch member 19 of the sprocket wheel, so as to cause said sprocket wheel to rotate with the friction disk and the shaft 10. However, there is a slight play between the clutch members 18 and 19. In Fig. 2, however, the clutch members 18 and 19 are dispensed with, and the sprocket wheel 11 and the disk 17 are constructed integral, or in one piece, as shown at 18ª in Fig. 2. A collar 21 is held upon the shaft 10 by the set bolt 22, so as to engage one face of the sprocket wheel 11, in order to hold the clutch members 18 and 19 in coöperation.

Revolubly mounted upon the shaft 10 is a sleeve 24 having a friction disk integral with one end thereof. This friction disk 25 is adapted to be forced frictionally against the friction disk 17, and when the friction disk 17 is in revoluble motion, a rotary motion is imparted to the disk 25, and as the sleeve 24 forms a part of the friction disk 25, motion is imparted to said sleeve. As the sleeve rotates, a steady pull is imparted upon a chain 26, which is attached at one end to said sleeve and wound about the same, which chain in turn at its other end is connected to the brake rod 27, and when the brake rod is operated by the chain the brake shoes (not shown) are applied. One end of the sleeve 24 is provided with an integral collar 29, with which a clutch member 30 engages frictionally to force the friction disk 25 against the disk 17.

The clutch member 30 is provided with an arm 31, to which a rod 32 is pivoted, to which in turn a spring 33 is connected. The clutch member 30 on one end thereof is provided with a rectangular portion 30ª, and one end of the arm 31 is provided with an enlargement 31ª, which is provided with a rectangular opening 31ᵇ, corresponding in shape to and fitting the rectangular portion 30ª, so that upon movement of the arm 31, the clutch member 30 will partially rock upon the shaft 10, thereby causing the cam or inclined surfaces of the clutch member 30 and the clutch member 42 to coöperate, in such wise as to cause the clutch members 30 and 42 to separate axially, and cause the friction face 30ᵇ to frictionally contact with one face of the collar 29 of the sleeve or drum 24 sufficiently to push the disk 25 frictionally in contact with the disk 17, thereby causing the disks 17 and 25 to rotate together, and pull upon the cable 26, which in turn will operate the brake lever 27. However, under ordinary conditions this frictional contact between the friction face 30ᵇ and the collar 29 of the sleeve or drum 24 is not great enough to retard the proper action of the disk 25 rotating substantially with the disk 17. In other words, under ordinary conditions, the arm 31 is not to be operated to its fullest extent, which would rock the clutch member 30 to such a degree as to cause the binding of the parts. However, in extreme cases, for instance, emergency cases, after the arm 31 has been operated to produce the action aforesaid as ordinarily used, and ordinarily applying the brake through the medium of the bar 27, the arm 31 may be operated or thrown substantially to its fullest extent, thereby causing the clutch members 30 and 42 to cam against each other and separate with sufficient force as to produce a binding action between the friction face 30ᵇ and the face of the collar 29 of the sleeve or drum 24, and a frictional binding between the disks 17 and 25, thereby assisting in retarding the action of the connections between the sprocket 11 and the drive axle 3, which is an additional function to the previously stated function of applying the brakes under ordinary conditions. The spring 33 is exceedingly stout, and is connected to an arm 34 of the rock rod 35, which is mounted in bearings 36 of the dash of the car body. Movable with the rock rod 35 is a lever 37, which is adapted to engage the teeth 38 of the rack quadrant 39, so as to hold the rock rod in adjusted positions. The clutch member 30 is provided with a pair of annular inclined surfaces 40, each of which terminate in a shoulder 41. Said clutch member 30 coöperates with a correspondingly constructed clutch member 42, which is also mounted upon the shaft 10, but is held against rotation by reason of the fact that a recess 43 receives the upper end portion of the bearing bracket 8.

When it is desired to apply the brake shoes (not shown), the lever 37 is operated so as to rock the rod 35, which in turn pulls upon the rod 32, thereby rocking the clutch member 30. When the clutch member 30 rocks, the inclined semi-annular surfaces of the correspondingly constructed clutch members 30 and 42 coöperate, so as to push the sleeve 24 in the direction of the friction disk 17, so as to cause the friction disk 25 to frictionally engage the disk 17. When the two disks frictionally engage, the tendency is to cause the disk 25 to rotate, and by reason of its rotation the said chain is wound upon the sleeve, thereby imparting a pulling action thereon, so as to apply the brake shoes. The tendency for the two disks to rotate as one body, also retard the action or rotation of the axle, owing to the sprocket chain connections therewith.

From the foregoing in connection with the drawing, it will be observed, that there has been produced a novel, simple and efficient appliance for applying brakes upon street cars, and one which has been found desirable and practicable.

The invention having been set forth, what is claimed as new and useful is:—

In a brake, a shaft, a pair of bearing hangers beneath a car body in which said shaft is mounted, a pair of friction elements on the shaft, one having connections with one of the drive axles of the car, whereas the other is provided with a cable connection to a brake bar, a clutch member having a clutch surface at one end and a transverse recess at the other end to receive a portion of one of the bracket hangers, a second clutch member having a clutch surface at one end to coöperate with the first clutch surface and being movable revolubly on said shaft, the other end of said second clutch member having a rectangular portion provided with a friction face, the friction element which is connected to the brake bar having an integral collar at one end frictionally with which the friction face of the second clutch member engages when said second clutch member is partially revolved, and a lever fitting said rectangular portion and having connections with a brake crank rod, whereby upon cranking said rod the second clutch member may be rocked.

In testimony whereof I have signed my name to this specification in the presence of two subscribing witnesses.

ALBERT H. HALE.

Witnesses:
A. F. STAEHLE,
C. C. TERRELL.